US011681819B1

(12) United States Patent
Surazski et al.

(10) Patent No.: US 11,681,819 B1
(45) Date of Patent: Jun. 20, 2023

(54) INTERACTIVE MEETING RECORDINGS

(71) Applicant: Fuze, Inc., Boston, MA (US)

(72) Inventors: Luke Surazski, Cambridge, MA (US);
Elias Sardonis, Cambridge, MA (US);
Jedidiah Brown, Seattle, WA (US)

(73) Assignee: 8x8, Inc., Campbell, CA (US)

( * ) Notice: Subject to any disclaimer, the term of this patent is extended or adjusted under 35 U.S.C. 154(b) by 904 days.

(21) Appl. No.: 16/529,388

(22) Filed: Aug. 1, 2019

(51) Int. Cl.
*G06F 21/62* (2013.01)
*G06F 16/9535* (2019.01)

(52) U.S. Cl.
CPC ...... *G06F 21/6218* (2013.01); *G06F 16/9535* (2019.01)

(58) Field of Classification Search
CPC .................................................. G06F 21/6218
See application file for complete search history.

(56) References Cited

U.S. PATENT DOCUMENTS

2009/0306981 A1\* 12/2009 Cromack .............. G06F 16/685
707/E17.103
2019/0088153 A1\* 3/2019 Bader-Natal ........... H04N 7/155

\* cited by examiner

*Primary Examiner* — Roland J Casillas
(74) *Attorney, Agent, or Firm* — Crawford Maunu PLLC

(57) ABSTRACT

A method including receiving a request to access a meeting record from a user is provided. The meeting record includes an identification for at least one participant in a meeting, an audio recording for the at least one participant, a video recording for the at least one participant, and a presentation from one of the participants in the meeting. The method includes verifying an access privilege of the user for the meeting record, providing the meeting record to the user, for playback of a selected portion, and providing, in the meeting record, a selecting tool to the user, for playing the selected portion, wherein the selecting tool is configured to playback the selected portion for one of multiple participants in the meeting.

20 Claims, 7 Drawing Sheets

INTERACTIVE MEETING RECORDINGS

BACKGROUND

Field

The present disclosure generally relates to a platform for real-time group communications such as meetings and teleconferences. More specifically, the present disclosure relates to a group meeting platform having an interactive feature to record a real-time summary of the meeting for the benefit of the participants in the meeting. Any one of the participants in the meeting may access, and interact with, the real-time summary at any point during the meeting.

Description of the Related Art

Currently, meeting recordings behave essentially like a video recording of the meeting. You press play and watch the meeting play out exactly as it happened, with the only context being the progress bar showing time elapsed as you watch (exactly like watching videos on YouTube or similar).

SUMMARY

In one embodiment of the present disclosure, a computer-implemented method is described that includes receiving a request to access a meeting record from a user. The meeting record may include at least one of: an identification for at least one participant in a meeting, an audio recording for the at least one participant, a video recording for the at least one participant, and a presentation from one of the participants in the meeting. The computer-implemented method also includes verifying an access privilege of the user for the meeting record, providing the meeting record to the user, for playback of a selected portion, and providing, in the meeting record, a selecting tool to the user, for playing the selected portion wherein the selecting tool is configured to playback the selected portion for one of multiple participants in the meeting.

According to one embodiment, a system is described that includes one or more processors and a memory coupled to the one or more processors, the memory including instructions that, when executed by the one or more processors, cause the system to receive a request to access a meeting record from a user, wherein the meeting record includes at least one of: an identification for at least one participant in a meeting, an audio recording for the at least one participant, a video recording for the at least one participant, and a presentation from one of the participants in the meeting. The instructions also cause the system to verify an access privilege of the user for the meeting record, to provide the meeting record to the user, for playback of a selected portion, and to provide, in the meeting record, a selecting tool to the user, for playing the selected portion wherein the selecting tool is configured to playback the selected portion for one of multiple participants in the meeting.

According to one embodiment, a computer-implemented method is provided that includes requesting, to a server, access to a meeting record. The meeting record includes at least one of an identification for at least one participant in a meeting, an audio recording for the at least one participant, a video recording for the at least one participant, and a presentation from one of the participants in the meeting. The computer-implemented method also includes accessing the meeting record in a client device, and selecting, with a selecting tool provided by the server to the client device, a portion of the meeting record for a replay wherein the selecting tool is configured to playback the selected portion for one of multiple participants in the meeting.

In yet another embodiment, a system is described that includes a means for storing commands and a means for executing the commands causing the system to perform a method including receiving a request to access a meeting record from a user. The meeting record may include at least one of: an identification for at least one participant in a meeting, an audio recording for the at least one participant, a video recording for the at least one participant, and a presentation from one of the participants in the meeting. The method also includes verifying an access privilege of the user for the meeting record, providing the meeting record to the user, for playback of a selected portion, and providing, in the meeting record, a selecting tool to the user, for playing the selected portion, wherein the selecting tool is configured to playback the selected portion for one of multiple participants in the meeting.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

A problem that arises in the realm of social networking through mobile computer devices, especially for enterprise networking, is that video recordings of meetings are unyielding for useful information. The multi-media files of meeting recordings are extremely large, and have very few indicators that may guide a user through the multiple relevant events that occurred during the meeting. Thus, the user is forced to spend inordinate amounts of time sifting through the massive stored information, to extract a relevant bit of information.

The disclosed system addresses the above problem specifically arising in the realm of computer technology by providing a solution also rooted in computer technology, namely, by providing an enhanced meeting record that includes multiple features enabling the user to extract quickly a desired information. The enhanced meeting record includes features beyond a traditional video experience that provide more context, information, interactivity, and customizability to the user experience. A meeting record as disclosed herein enables the user to see the meeting "at a glance," and review selected portions of the meeting (e.g., choose video, text, or both to extract meeting information, and have fine control over playback features to consume the meeting documents).

In some embodiments, the meeting record includes a highlight reel video of a single meeting participant. In some embodiments, the meeting record can mute one or more participants for at least a portion of the meeting record. The meeting record may include a feature for the user to jump to a point in the meeting when a screen share occurred and to view changes to screen share. Further, some embodiments include a feature that enables identifying relevant meeting participants (at the user's request and with the participant's permission), or participants that a user has been interested on during the past. Some embodiments may apply artificial intelligence and machine learning routines to identify topics and themes in different portions of a meeting, and correlate those with a topic of interest for the user, so as to present the user with a relevant portion of the meeting based on the user interest. Some embodiments may include a search engine to offer the user the possibility to directly search for a specific topic or theme within the meeting, or a portion of the meeting where one word or phrase was mentioned.

Example System Architecture

Figure 1:
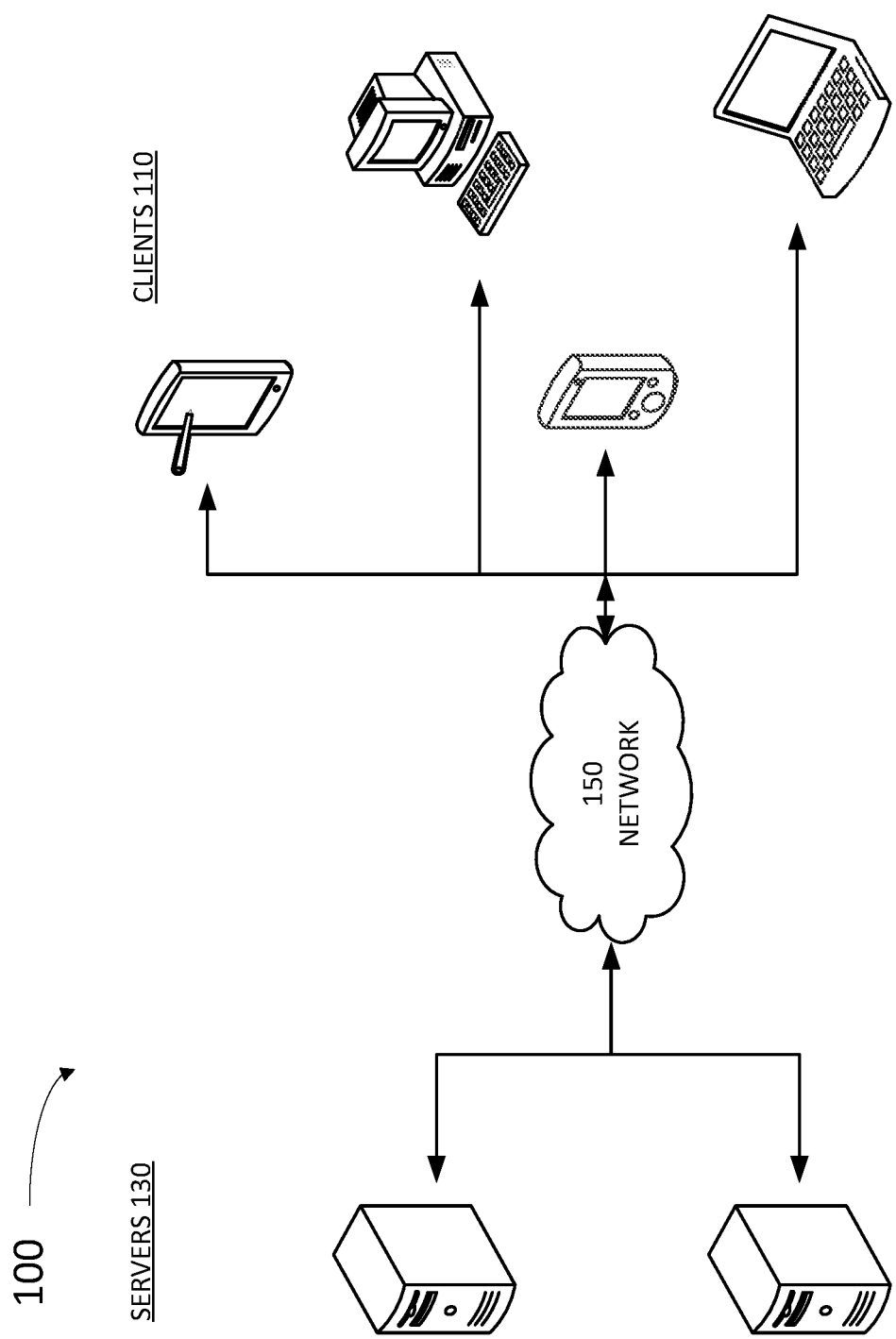
FIG. 1 illustrates an example architecture suitable to provide a platform for a meeting, according to some embodiments.

FIG. 1 illustrates an example architecture 100 suitable to provide a platform for a meeting, according to some embodiments. Architecture 100 includes servers 130 and clients 110 connected over a network 150. One of the many servers 130 is configured to host a memory including instructions which, when executed by a processor, cause server 130 to perform at least some of the steps in methods as disclosed herein. In some embodiments, the processor in server 130 is configured to host a meeting that a participant may access through client device 110. Further, in some embodiments, the processor in server 130 is configured to provide documents including images, video, and text messaging services to a participant in a meeting through client device 110. In some embodiments, the documents provided by server 130 to one or more participants may include an application-based document (e.g., a text-rich document such as a Word document, a PDF document, or any other document accessible through a text editing application, including a computer code sequence, and the like), a spreadsheet document (e.g., Excel and the like), a presentation document (e.g., Power Point and the like), an XML file, an HTML file, a multi-media file such as a video, audio, image file, or any combination of the above. Information related to, and instructions to handle the meeting may be stored in a summary engine 242 accessible by a participant through a client device 110 (e.g., accessible through a web page or an application 222 running on client device 110). Servers 130 can return images, documents, rich-text documents, and the like intended for a shared use and modification by multiple participants in a meeting. For purposes of load balancing, multiple servers 130 can host memories including instructions to one or more processors and multiple servers 130 for hosting one or more meetings as disclosed herein.

Servers 130 may include any device having an appropriate processor, memory, and communications capability for hosting the documents and applications associated with meeting engine 242. Meeting support engine 232, may be accessible by multiple participants through various client devices 110 over the network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing summary engine 242 on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
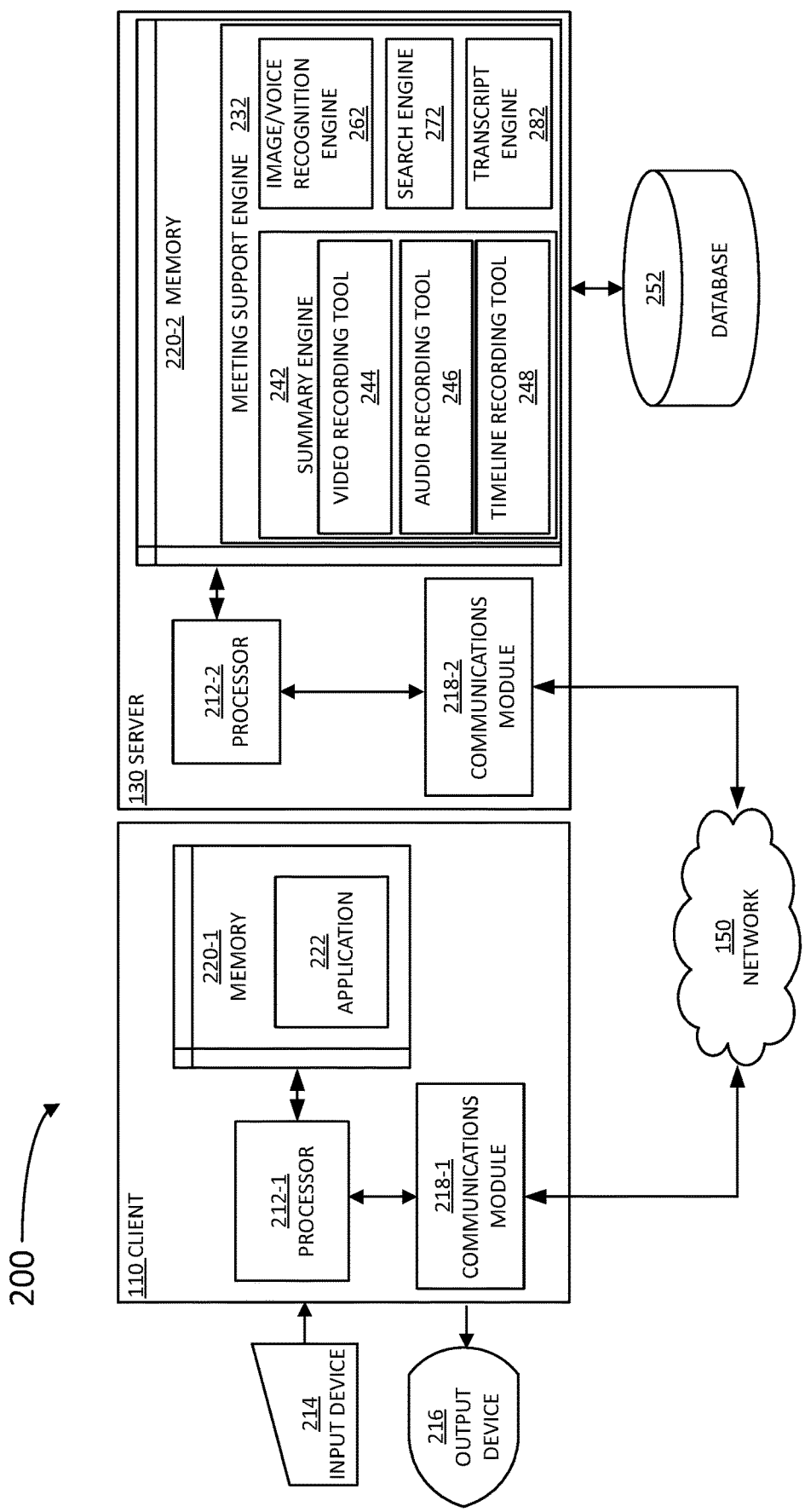
FIG. 2 is a block diagram illustrating an example server and client from the architecture of FIG. 1, according to certain aspects of the disclosure.

FIG. 2 is a block diagram 200 illustrating an example server 130 and client device 110 in the architecture 100 of FIG. 1, according to certain aspects of the disclosure. Client device 110 and server 130 are communicatively coupled over network 150 via communications modules 218-1 and 218-2 (hereinafter, collectively referred to as "communications modules 218"), respectively. Communications modules 218 are configured to interface with network 150 to send and receive information, such as data, requests, responses, and commands to other devices on the network. Communications modules 218 can be, for example, modems or Ethernet cards, and include radio hardware and software, such as radio-frequency (RF) antennas, modulators, demodulators, analog-to-digital converters, and digital-to-analog converters (DAC).

Client device 110 may be any one of a desktop computer, a laptop, or a mobile computing device. Client device 110 may include a processor 212-1 and a memory 220-1. An input device 214 and an output device 216 enable the user to interact with client device 110. Examples of input device 214 and output device 216 may include a mouse, a keyboard, a display, a touch-interactive display, and the like. In some embodiments, input device 214 may include a camera, a video camera, and a microphone. Accordingly, client device 110 may collect an audio signal, a video signal, or a combination thereof from the user (e.g., in a remote meeting event, for other participants to see and record), and transmit the signal to a server 130 through communications module 218-1.

Server 130 includes a memory 220-2, a processor 212-2, and communications module 218-2. The user interface is displayed for the user in an output device 216 of client device 110. Memory 220-2 includes a meeting support engine 232 to enable server 130 to support a network-based meeting of multiple remote participants (e.g., users of client devices 110). Meeting support engine may also include a summary engine 242, an image/voice recognition engine 262, and a search engine 272. Server 130 may also be communicatively coupled with a database 252, storing data and information collected from or provided to the multiple participants of a meeting, before or after the meeting starts or the meeting ends. Meeting support engine 232 includes instructions which, when executed by processor 212-2, cause server 130 to perform at least partially steps as disclosed herein. For example, meeting support engine 232 includes instructions to communicate with application 222 to incorporate the user of client device 110 as a participant of a meeting, as disclosed herein. Meeting support engine 232 may also include instructions to store a history log and other data related to a meeting as disclosed herein into database 252. Furthermore, in some embodiments, meeting support engine 232 may include instructions to retrieve at least some of the data in database 252 and provide to one or more participants in a meeting, as disclosed herein. Processors 212-1 and 212-2, and memories 220-1 and 220-2 will be collectively referred to, hereinafter, as "processors 212" and "memories 220," respectively.

In some embodiments, meeting support engine 232 stores and maintains for a selected period of time, data in database 252. Further, meeting support engine 232 updates different changes and modifications on a document or file discussed during the meeting, as part of a chat/topic history, as stored in database 252. In some embodiments, the activity, notes, and other actions taken by different participants over a document or any other topic item are displayed around the item, showing the specific participant that has participated in the activity. As mentioned above, the document stored by server 130 in database 252 may include an application-based document (e.g., a text-rich document such as a Word document, a PDF document, or any other document accessible through a text editing application, including a computer code sequence, and the like), a spreadsheet document (e.g., Excel and the like), a presentation document (e.g., Power Point and the like), an XML file, an HTML file, or a multi-media file such as a video, audio, image file, or any combination of the above.

A participant may access a meeting hosted by meeting support engine 232 through application 222 installed in memory 220-1 of client device 110. The participant may also access the meeting hosted by meeting support engine 232 via a web browser installed in client device 110. A processor 212-1 in client device 110 may control execution of application 222. In some embodiments, application 222 is downloaded and installed by the participant into client device 110, from server 130.

Processor 212-2 is configured to execute instructions, such as instructions physically coded into processor 212-2, instructions received from software in memory 220-2, or a combination thereof. A participant using client device 110 may submit, through input device 214, a document or a media file (e.g., a video or an audio stream) to meeting support engine 232 via a user interface of application 222. The document or multi-media file submitted by the participant may include an application-based document (e.g., a text-rich document such as a Word document, a PDF document, or any other document accessible through a text editing application, including a computer code sequence, and the like), a spreadsheet document (e.g., Excel and the like), a presentation document (e.g., Power Point and the like), an XML file, an HTML file or a multi-media file such as a video, audio, image file, or any combination of the above.

More specifically, meeting support engine 232 may include a summary engine 242 configured to create a meeting record and make it available to the meeting participants in real-time. To this end, summary engine 242 may include a video recording tool 244, an audio recording tool 246, and a timeline recording tool 248. Video recording tool 244 may be configured to receive video streams from one or more participants using client devices 110, and creating a library of video files organized according to the participants and the moment in time when the video was recorded, during the meeting. Audio recording tool 246 may be configured to do a similar task as video recording tool 244, but using audio streams from one or more participants using client devices 110. Timeline recording tool 248 may cooperate with video recording tool 244 and audio recording tool 246 to produce a timeline record of the meeting that includes video and audio stream from each of the multiple participants that intervened during the meeting. In some embodiments, timeline recording tool 248 may also retrieve a document presented by any one of the participants, during the meeting, and place the document in the appropriate niche along the timeline record for the meeting.

In some embodiments, summary engine 242 may be configured to identify different meeting phases (e.g., "waiting for people to join," "welcome and introductions," "presentation," "Q&A," "wrap up," and the like) and explicitly indicate the different phases in a timeline for the meeting record displayed in application 222.

In some embodiments, meeting support engine 232 may also include an image/voice recognition engine 262 and a search engine 272. Image/voice recognition engine 262 may be configured to receive the video and/or audio stream from each of the participants in the meeting, and identify the respective participant. To do this, image/voice recognition engine 262 may apply digital pattern recognition techniques and algorithms, such as machine learning algorithms, artificial intelligence, or neural network trained algorithms, using data stored in database 252. In some embodiments, image/voice recognition engine 262 may be triggered into action after a permission is granted by one or all of the meeting participants to do so. Accordingly, image/voice recognition engine 262 may identify and include the name and contact information of each of the participants in the meeting record. Furthermore, in combination with timeline recording tool 248, this feature may enable for each participant to know, select and parse, at any time during the meeting, what was said by whom.

Moreover, in some embodiments, search engine 272 may be configured to receive a query from any one of the participants, in real time, to perform a search within the meeting record. For example, a participant may desire to find a specific screenshot provided by one of the other participants earlier in the meeting. In some embodiments, a participant may use search engine 272 to search for a particular term mentioned by one of the participants during a conversation stored in the meeting record. In that regard, meeting support engine 232 may also include a transcript engine 282, configured to transcribe at least a portion of audio stream into a text file.

Some embodiments include artificial intelligence software and other nonlinear techniques such as neural networks or machine learning to identify for display, within the meeting record, topics of interest to a specific participant. Thus, for example, some embodiments may identify different portions during the meeting, more or less relevant to a main topic of the meeting. For example, in some embodiments, meeting support engine 232 may identify an introductory portion of the meeting based on known phrases (e.g., "hello" and until you get to "let's get started"). Accordingly, a timeline description of the meeting may include labels for the different meeting portions (welcome & introductions, project description, decision making, tasks, adjournment, and the like). The participant browsing the meeting record may decide to skip forward or backward through the different portions of the timeline. Moreover, in some embodiments, the meeting support engine 232 may identify and mark a decision making event in a meeting record. For example, meeting support engine 232 may record different participants in the session and their votes in a decision making poll (e.g., a "yes" or "no" decision).

In some embodiments, meeting support engine 232 may further create a template/patterning around types of meetings based on certain characteristics identified for the meeting. For example, in some embodiments, meeting support engine 232 may determine that a meeting that lasts 30 minutes and includes six (6) participants may typically include about three (3) minutes of irrelevant introduction, and then evolve into a round robin wherein each participant intervenes sequentially for a similar period of time. In some instances, meeting support engine 232 may identify a portion of the meeting devoted to a presentation (e.g., a silence followed by one participant talking followed by questions).

Figure 3:
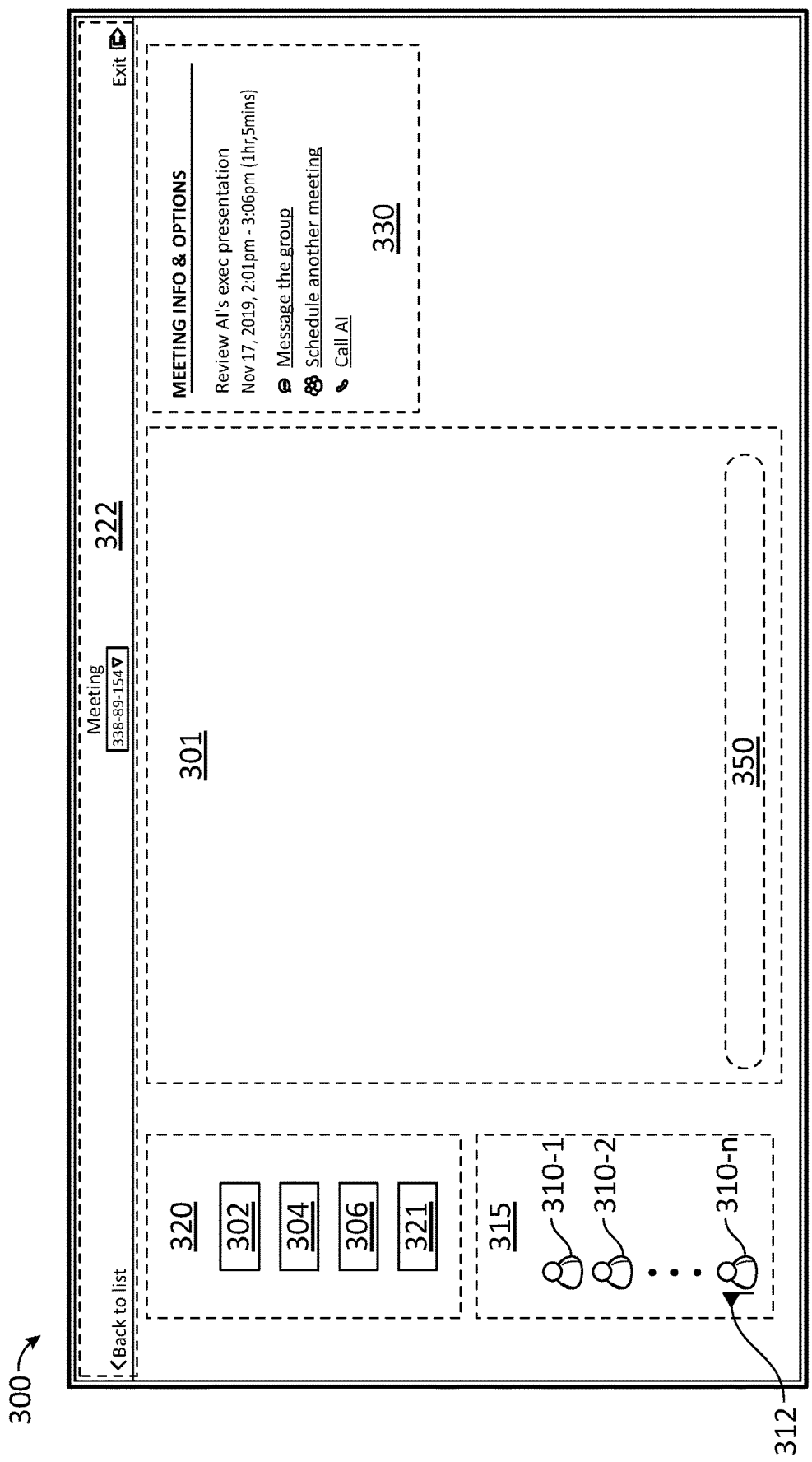
FIG. 3 illustrates a screen shot of an application supporting a meeting for multiple participants and providing a meeting record to the participants before the meeting is over, according to some embodiments.

FIG. 3 illustrates a screen shot 300 of an application 322 supporting a meeting for multiple participants and providing a meeting record 320 to the participants before the meeting is over, according to some embodiments. In some embodiments, application 322 is installed and running in a client device (cf. application 222 and client device 110), while hosted remotely via a meeting support engine in a server (e.g., server 130 and meeting support engine 232). Screen shot 300 may be provided, at least partially, on a display in the client device (e.g., output device 216) used by any one of the participants in the meeting. In some embodiments, screen shot 300 is similar for each of multiple devices 110 used by the different participants. In some embodiments, the nature and content of screen shot 300 may be determined by the capabilities of client device 110 for each participant. Screen shot 300 includes a central field 301 displaying details of the meeting, a settings field 330, a task bar 350, and a participants list 315. Participants list 315 may include icons 310-1, 310-2 through 310-n (hereinafter, collectively referred to as "icons 310"), associated to each of the participants in the meeting. In some embodiments, at least one of icons 310 may include a flag 312, indicative that the participant may have temporarily stepped away from the meeting, or may be busy in a parallel activity (e.g., a phone call, an e-mail or texting outside of the meeting). In some embodiments, flag 312 may be automatically placed by application 322, or it may be actioned by the participant (e.g., participant 310-n, as shown).

Central field 301 may include a display for a presentation or any other multimedia file being presented for the participants, in the meeting. Meeting record 320 may include a summary and highlights of the meeting in real-time. For example, meeting record 320 may indicate topics covered and quotes from different participants during the meeting (including the source of the quotes). In some embodiments, an artificial intelligence or machine learning algorithm is configured to parse through the contents of meeting record 320, identify a topic of the meeting, and select quotes and information relevant for the topic of the meeting. Meeting record 320 may also include transcripts of one or more of the audio streams collected during the meeting (e.g., video/audio streams 321).

Other features in meeting record 320 may include an "Instant replay" button 302 that allows a participant to scrub backwards in the meeting timeline to replay an audio/video/screen share. The participant may desire to replay the meeting record for many reasons: arriving late to the meeting, having to step away, or simply to re-inforce or clarify a portion of the meeting. In some embodiments, the system automatically mutes a live audio capture from the participant while the participant replays the meeting record. In some embodiments, a "Get caught up" feature 304 shows a timeline-to-date, a condensed transcript of highlights (with option to scan the full transcript), and optional video/audio replay to participants who are joining late (or not yet joined, but considering). A "Step away" button 306 enables the participant to flag itself as "away" from the meeting, so other participants are aware, thus avoiding confusion. Feature 304 provides the missing information for the returning participant.

Settings field 330 includes miscellaneous meeting information and options, such as a tab for sending a message to a group of participants or to all participants, or an option to schedule another meeting (with same participants, e.g., a follow up meeting, or with different participants).

Figure 4:
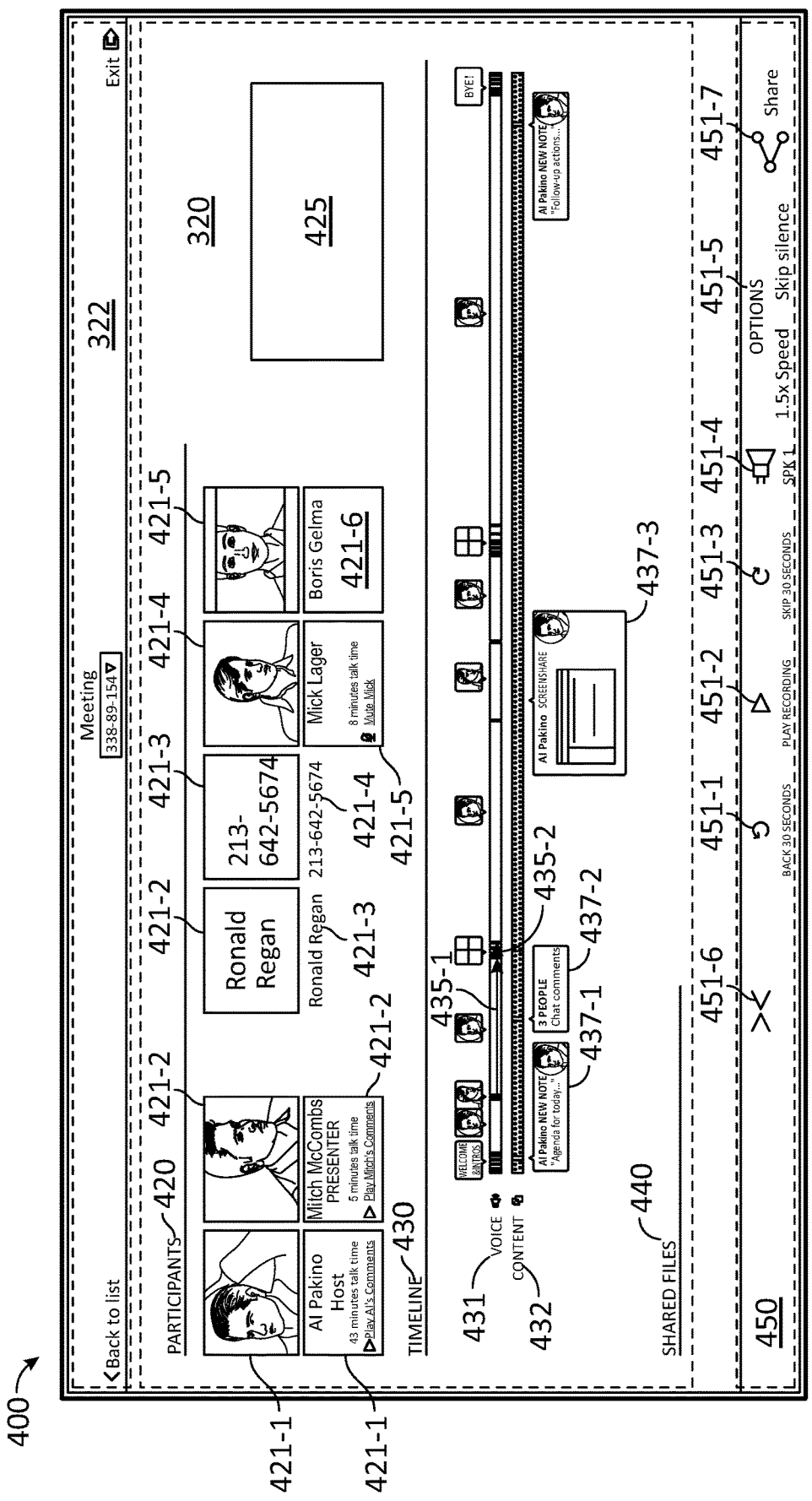
FIG. 4 illustrates a screen shot of an application for providing an interactive meeting record in a group communication, according to some embodiments.

FIG. 4 illustrates a screen shot 400 of an application 322 for providing an interactive meeting record 320 in a group communication, according to some embodiments. A participants space 420 indicates meeting participants with icons, or identifiers 421-1, 421-2, 421-3, 421-4, 421-5, and 421-6 (hereinafter, collectively referred to as "identifiers 421"). In some embodiments, identifiers 421 may be obtained by application 322 from image/voice recognition of the respective participant. In some embodiments, identifiers 421 may be retrieved from a database including the names of each participant associated with an account or a client device registered with a meeting support engine (e.g., meeting support engine 232). Identifiers 421 may include a name of the participant, a telephone number, an e-mail of the participant, and a total time that the participant intervened during the meeting. In some embodiments, identifiers 421 may include a link to an audio/video file that includes comments and video of the contribution of each participant, during the meeting. Further, in some embodiments, identifier 421 may include an option to mute a participant during replay of at least a portion of meeting record 320. In some embodiments, identifier 421 may also include an option to only hear the interventions of the selected participant in the meeting.

A meeting summary information 425 may include a list of the topics discussed, a list of people mentioned by name (participants or not), important quotes, and a link to full transcript and documentation associated with each of the topics.

A timeline space 430 includes a voice timeline 431 and a content timeline 432. Voice timeline 431 includes thumbnails 435-1 and 435-2 illustrating one of icons 410 associated with the participant that is speaking at any given moment. Content timeline includes callouts 437-1, 437-2, and 437-3 (hereinafter, collectively referred to as "callouts 437") indicating the type of contribution provided by any given participant (identified by a thumbnail of the respective icon) at the time indicated in the callout. In some embodiments, voice timeline 431 or content timeline 432 may be color coded according to the different participants that are contributing to the meeting for a given span of time. This feature is particularly useful for participants, as they may easily identify who was talking at any given moment of the meeting, thus enabling a more efficient parsing of the meeting record when looking for a desired information. The user may simply activate any point along the timeline to access a desired place in the meeting, based on who is talking, callouts 437, transcript, active screen share, color code, break-up points, and any other visual aids. In some embodiments, one or more callouts 437 may indicate whether a participant has joined or left the meeting. In some embodiments, voice timeline 431 may identify different meeting phases (e.g., via color coding, and the like).

A shared files space 440 includes the files and documents that have been discussed and shared so far, during the meeting. In some embodiments, shared files space 440 may include audio files, video files, and other multi-media files shared by one or more participants in the meeting. For example, in some embodiments, shared files space 440 includes a transcript of the respective audio files from each time the participant speaks during the meeting.

A selecting tool bar 450 includes multiple tools for the user to select portions of meeting record 320. For example, a "play" tool 451-2 may be used to play at least a portion of a video, audio, or screen share file. "Back 30 seconds" tool 451-1 and "skip 30 seconds" tool 451-3 may be auxiliary to play tool 451-2 to easily pause, skip forward, or skip backwards the audio/video file, as desired.

More specifically, an audio and video control tools 451-4 and 451-5, respectively, may include several features, such as: "Skip silence" to automatically shorten periods of silence during playback; "High speed" to accelerate review of the meeting at a slightly higher speed, with audio processing to keep the audio as normal as possible (e.g., intelligible); "Skip ahead" to jump 30 seconds, 1 minute, or any desired time lapse ahead in the recording with one click and move past sections of minor relevance; and "Skip back" to jump 15 seconds (or any desired time lapse) back and let the user replay key moments. Moreover, tools 451-4 and 451-5 may include tracking features to play the full meeting as it happened, to mute certain people (if there is background noise), or to choose a person to hear an automatic highlight reel of just that person's comments.

A "condense" tool 451-6 may shorten an audio or video file by skipping frames at a rate that depends on relevance to the topic, or on variability of the content. For example, condense tool 451-6 includes automatic transitions to portions of the video or audio stream where the data changes substantially. This tool substantially reduces the time it takes for the user to sort out the relevant information from a lengthy presentation. In some embodiments, a condense tool 451-6 may include a shift feature (e.g., a double click action, or sustained press) to revert into the regular meeting recording to hear the associated audio track at any time.

A "share" tool 451-7 enables the user to share a video/audio, a document, or a portion thereof, with a second user in a network. The second user may be a meeting participant, or someone having appropriate access certificates. Share tool 451-7 may include a "Link to here" feature that enables a user to link a second user directly to a specific place in the recording. In some embodiments, share tool 451-7 may include a "Share this moment" feature that enables the user to define start and end points and create a specific snippet that can be consumed separately from the full recording, by the second user.

Figure 5:
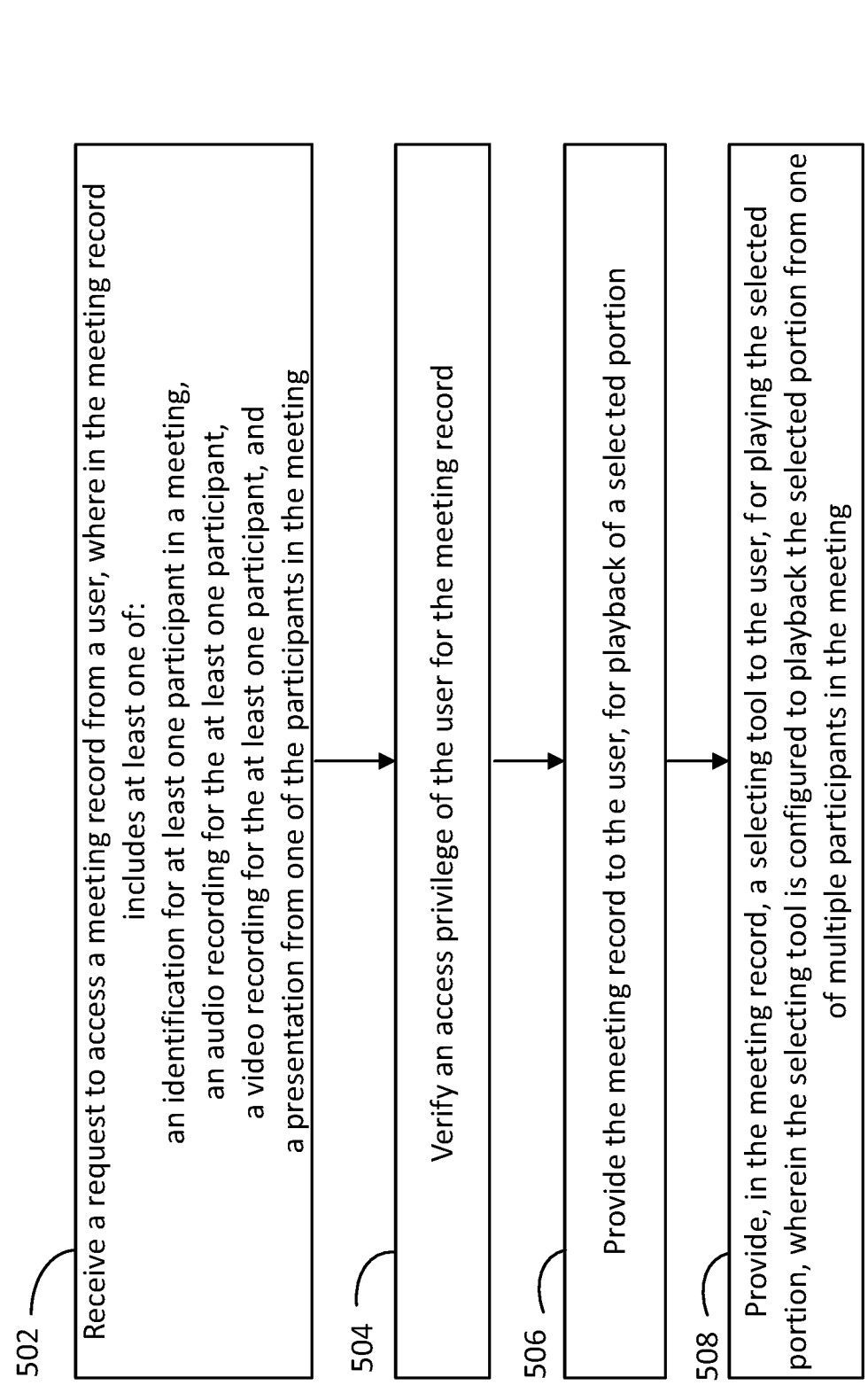
FIG. 5 is a flowchart illustrating steps in a method for providing a meeting record to a participant of the meeting, according to some embodiments.

FIG. 5 is a flowchart illustrating steps in a method 500 for hosting a meeting in a server, according to some embodiments. Method 500 may be performed at least partially by any one of the network servers hosting a meeting for multiple remote participants using client devices communicatively coupled with the network server through a network, using a communication module (e.g., server 130, client devices 110, network 150, and communication modules 218). The network server may include a support engine, a summary engine, an image/voice recognition engine, or a search engine (e.g., meeting support engine 232, summary engine 242, image/voice recognition engine 262, and search engine 272), as disclosed herein. At least some of the steps in method 500 may be performed by a computer having a processor executing commands stored in a memory of the computer (e.g., processors 212 and memories 220). For example, at least some of the commands may be included in an application installed in a client device accessible by a user (e.g., application 222). Further, steps as disclosed in method 500 may include retrieving, editing, and/or storing files in a database that is part of, or is communicably coupled to, the computer (e.g., database 252). Methods consistent with the present disclosure may include at least some, but not all, of the steps illustrated in method 500, performed in a different sequence. Furthermore, methods consistent with the present disclosure may include at least two or more steps as in method 500 performed overlapping in time, or almost simultaneously.

Step 502 includes receiving a request to access a meeting record from a user. The meeting record includes at least one of: an identification for at least one participant in the meeting, an audio recording for the at least one participant, a video recording for the at least one participant, and a presentation from one of the participants in the meeting.

Step 504 includes verifying an access privilege of the user for the meeting record.

In some embodiments, the meeting record further includes a topic of the meeting, and verifying an access privilege of the user for the meeting record includes validating a user credential based on the topic of the meeting.

Step 506 includes providing the meeting record to the user, for playback of a selected portion. In some embodiments, step 506 includes transcribing into a text document at least a portion of the audio recording or the video recording.

Step 508 includes providing, in the meeting record, a selecting tool to the user, for playing the selected portion, wherein the selecting tool is configured to playback the selected portion from one of multiple participants in the meeting. In some embodiments, the selecting tool may be configured to muting other participants in the meeting when playing back the selected portion in step 508. In some embodiments, the selecting tool includes a search engine, and step 508 includes receiving a search query from the user in the search engine and extracting the selected portion from the meeting record based on the search query. In some embodiments, step 508 includes providing the user an access to a document in the meeting record based on the access privilege of the user. In some embodiments, the meeting record includes a timeline sequence of relevant events and participant actions in the meeting, and step 508 includes retrieving a document based on a position of the selecting tool on the timeline sequence of relevant events. In some embodiments, step 508 includes identifying a topic of the meeting and linking the meeting record to a second meeting record based on the topic of the meeting. In some embodiments, step 508 includes providing a universal resource locator address for a browser in a client device for the user. In some embodiments, the meeting record includes a personalized menu organized based on the participants, and step 508 further includes selecting, with the selecting tool, a video, an audio, or a transcript of a specific participant from the personalized menu. In some embodiments, step 508 includes providing, in the meeting record, an option for the user to share the meeting record with a third party.

Figure 6:
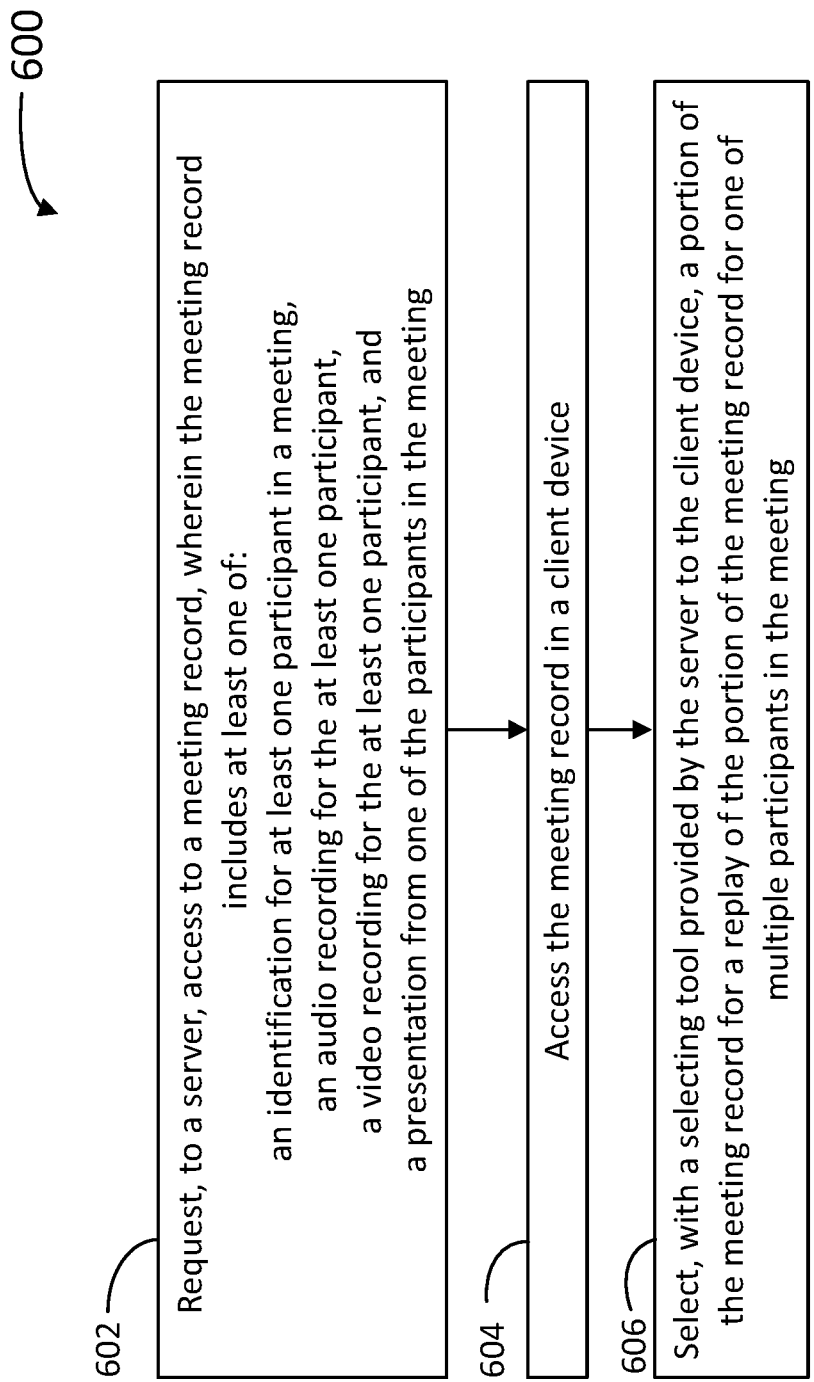
FIG. 6 is a flowchart illustrating steps in a method for accessing a meeting record in a server hosting a meeting support engine, according to some embodiments.

FIG. 6 is a flowchart illustrating steps in a method 600 for participating in a meeting in a server, according to some embodiments. Method 600 may be performed at least partially by any one of the network servers hosting a meeting for multiple remote participants using client devices communicatively coupled with the network server through a network, using a communication module (e.g., server 130, client devices 110, network 150, and communication modules 218). The network server may include a support engine, a summary engine, an image/voice recognition engine, or a search engine (e.g., meeting support engine 232, summary engine 242, image/voice recognition engine 262, and search engine 272), as disclosed herein. At least some of the steps in method 600 may be performed by a computer having a processor executing commands stored in a memory of the computer (e.g., processors 212 and memories 220). For example, at least some of the commands may be included in an application installed in a client device accessible by a user (e.g., application 222). Further, steps as disclosed in method 600 may include retrieving, editing, and/or storing files in a database that is part of, or is communicably coupled to, the computer (e.g., database 252). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes requesting, to a server, access to a meeting record, wherein the meeting record includes at least one of: an identification for at least one participant in the meeting, an audio recording for the at least one participant, a video recording for the at least one participant, and a presentation from one of the participants in the meeting.

Step 604 includes accessing the meeting record in a client device.

Step 606 includes selecting, with a selecting tool provided by the server to the client device, a portion of the meeting record for a replay of the portion of the meeting record for one of multiple participants in the meeting. In some embodiments, the selecting tool includes a search engine, and step 606 further includes providing a search query in the search engine and extracting the portion of the meeting record for a replay based on the search query. In some embodiments, the meeting record comprises a timeline sequence of relevant events and participant actions in the meeting, and step 606 includes retrieving a document based on a position of the selecting tool on the timeline sequence of relevant events. In some embodiments, step 606 further includes sharing the meeting record with a third party. In some embodiments, step 606 further includes modifying the video recording for the at least one participant to mute a second participant in the video recording. In some embodiments, step 606 further includes selecting the portion based on a topic of the portion and on an identity of an active participant in the portion.

Hardware Overview

Figure 7:
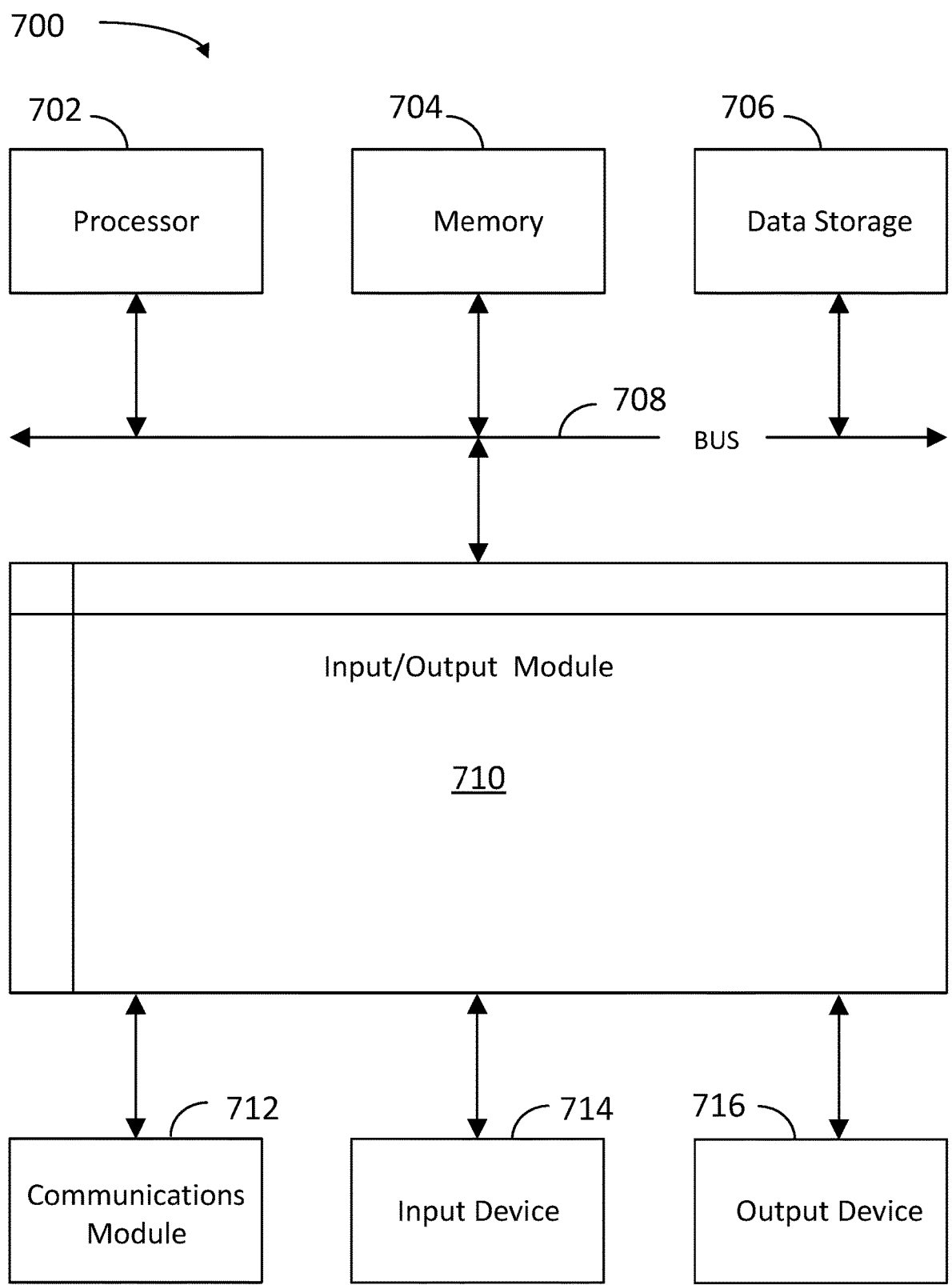
FIG. 7 is a block diagram illustrating an example computer system with which the client and server of FIGS. 1 and 2, and the methods of FIGS. 5 and 6 can be implemented, according to some embodiments.

FIG. 7 is a block diagram illustrating an exemplary computer system 700 with which the client device 110 and server 130 of FIGS. 1-2, and the methods of FIGS. 5 and 6 can be implemented. In certain aspects, the computer system 700 may be implemented using hardware or a combination of software and hardware, either in a dedicated server, or integrated into another entity, or distributed across multiple entities.

Computer system 700 (e.g., client device 110 and server 130) includes a bus 708 or other communication mechanism for communicating information, and a processor 702 (e.g., processors 212) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, a code that creates an execution environment for the computer program in question, e.g., code that constitutes processor firmware, a protocol stack, a database management system, an operating system, or a combination of one or more of them stored in an included memory 704 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, a special purpose logic circuitry.

The instructions may be stored in the memory 704 and implemented in one or more computer program products, i.e., one or more modules of computer program instructions encoded on a computer-readable medium for execution by, or to control the operation of, the computer system 700, and according to any method well known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. Input/output module 710 can be any input/output module. Exemplary input/output modules 710 include data ports such as USB ports. The input/output module 710 is configured to connect to a communications module 712. Exemplary communications modules 712 (e.g., communications modules 218) include networking interface cards, such as Ethernet cards and modems. In certain aspects, input/output module 710 is configured to connect to a plurality of devices, such as an input device 714 (e.g., input device 214) and/or an output device 716 (e.g., output device 216). Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 716 include display devices, such as an LCD (liquid crystal display) monitor, for displaying information to the user.

According to one aspect of the present disclosure, the client device 110 and server 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship with each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   receiving a request to access a meeting record from a user, wherein the meeting record includes an identification for at least one participant in a meeting, and at least one of:
      an audio recording for the at least one participant,
      a video recording for the at least one participant, and
      a presentation from one of the participants in the meeting;
   verifying an access privilege of the user for at least a selected portion, including one or more selected aspects, of the meeting record;
   providing the meeting record to the user, for playback or reproduction of the selected portion, wherein the meeting record indicates where in the selected portion that at least one of the participants has left the meeting before the meeting ends; and
   providing, in the meeting record, a selecting tool to the user, for playing or reproducing the selected portion, with the meeting record indicating for the selected portion, that said at least one of the participants joined the meeting or left the meeting before the meeting ends, wherein the selecting tool is configured to playback or reproduce the selected portion.

2. The computer-implemented method of claim 1, wherein the meeting record further comprises a topic of the meeting, and verifying an access privilege of the user for the meeting record comprises validating a user credential based on the topic of the meeting.

3. The computer-implemented method of claim 1, wherein providing the meeting record to the user comprises transcribing into a text document at least a portion of the audio recording or the video recording.

4. The computer-implemented method of claim 1, wherein the selecting tool includes a search engine, further comprising receiving a search query from the user in the search engine and extracting the selected portion from the meeting record based on the search query.

5. The computer-implemented method of claim 1, wherein providing the meeting record to the user comprises providing the user an access to a document in the meeting record based on the access privilege of the user.

6. The computer-implemented method of claim 1, wherein the meeting record comprises a timeline sequence, of relevant events and participant actions in the meeting, including a callout or other timeline point to indicate said at least one of the participants joining the meeting or leaving the meeting, and wherein providing a selecting tool to the user includes permitting the user to select a portion of the meeting record based on a position of the selecting tool on the timeline sequence of relevant events.

7. The computer-implemented method of claim 1, further comprising identifying a topic of the meeting and linking the meeting record to a second meeting record based on the topic of the meeting.

8. The computer-implemented method of claim 1, wherein providing the meeting record to the user comprises providing a universal resource locator address for a browser in a client device for the user.

9. The computer-implemented method of claim 1, wherein the meeting record includes a personalized menu organized based on the participants, and further comprising selecting, with the selecting tool, a video, an audio, or a transcript of a specific participant from the personalized menu.

10. The computer-implemented method of claim 1, further comprising providing, in the meeting record, an option for the user to share the meeting record with a third party.

11. A system comprising:
    a memory storing instructions; and
    one or more processors configured to execute the instructions to cause the system to:

receive a request to access a meeting record from a user, wherein the meeting record includes an identification for at least one participant in a meeting, and at least one of:
- an audio recording for the at least one participant,
- a video recording for the at least one participant, and
- a presentation from one of the participants in the meeting;

verify an access privilege of the user for at least a selected portion, including one or more selected aspects, of the meeting record;

provide the meeting record to the user, for playback or reproduction of the selected portion, wherein the meeting record indicates where in the selected portion that at least one of the participants joined the meeting after the meeting began or left the meeting before the meeting ended; and provide, in the meeting record, a selecting tool to the user, for playing or reproducing the selected portion, with the meeting record indicating that said at least one of the participants joined the meeting after the meeting began or left the meeting before the meeting ended, wherein the selecting tool is configured to playback or reproduce the selected portion.

12. The system of claim 11, wherein the selecting tool includes a search engine, and the one or more processors further execute instructions to receive a search query from the user in the search engine and extract the selected portion from the meeting record based on the search query.

13. The system of claim 11, wherein the meeting record includes a topic of the meeting, and to verify an access privilege of the user for the meeting record the one or more processors are further configured to validate a user credential based on the topic of the meeting.

14. The system of claim 11, wherein to provide the meeting record to the user the one or more processors execute instructions to transcribe into a text document at least a portion of the audio recording or the video recording.

15. A computer-implemented method comprising:
requesting, to a server, access to a meeting record, wherein the meeting record includes an identification for at least one participant in a meeting, and at least one of:
- an audio recording for the at least one participant,
- a video recording for the at least one participant, and
- a presentation from one of the participants in the meeting;

accessing the meeting record in a client device; and selecting, with a selecting tool provided by the server to the client device, a portion of the meeting record for a replay or reproduction, with the meeting record indicating for the selected portion, that said at least one of the participants joined the meeting after the meeting began or left the meeting before the meeting ended, wherein the selecting tool is configured to playback or reproduce the portion of the meeting record.

16. The computer-implemented method of claim 15, wherein the selecting tool includes a search engine, and further providing a search query in the search engine and extracting the portion of the meeting record for a replay based on the search query.

17. The computer-implemented method of claim 15, wherein the meeting record comprises a timeline sequence of relevant events and participant actions in the meeting, including a callout or other timeline point to indicate said at least one of the participants joining the meeting or leaving the meeting, and wherein selecting a portion of the meeting record includes permitting a user to select the portion of the meeting record based on a position of the selecting tool on the timeline sequence of relevant events.

18. The computer-implemented method of claim 15, further comprising sharing the meeting record with a third party.

19. The computer-implemented method of claim 15, wherein selecting a portion of the meeting record for a replay comprises modifying the video recording for the at least one participant to mute a second participant in the video recording.

20. The computer-implemented method of claim 15, wherein selecting a portion of the meeting record for a replay comprises selecting the portion based on a topic of the portion and on an identity of an active participant in the portion.

* * * * *